(12) United States Patent
Werdehausen et al.

(10) Patent No.: US 12,704,704 B2
(45) Date of Patent: Aug. 11, 2026

(54) FINITY-CORRECTED MICROSCOPE OBJECTIVE FOR SCANNING APPLICATIONS

(71) Applicant: Carl Zeiss Microscopy GmbH, Jena (DE)

(72) Inventors: Daniel Werdehausen, Oberkochen (DE); Yueqian Zhang, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 230 days.

(21) Appl. No.: 18/758,085

(22) Filed: Jun. 28, 2024

(65) Prior Publication Data

US 2025/0013027 A1 Jan. 9, 2025

(30) Foreign Application Priority Data

Jul. 4, 2023 (DE) .................... 10 2023 206 339.5

(51) Int. Cl.

*G02B 21/02* (2006.01)
*G02B 9/12* (2006.01)
*G02B 21/36* (2006.01)

(52) U.S. Cl.

CPC ............... *G02B 21/02* (2013.01); *G02B 9/12* (2013.01); *G02B 21/367* (2013.01)

(58) Field of Classification Search

CPC ......... G02B 21/02; G02B 9/12; G02B 21/367
USPC ................................................ 359/656, 661
See application file for complete search history.

(56) References Cited

U.S. PATENT DOCUMENTS

| | | | |
|---|---|---|---|
| 5,808,807 | A | 9/1998 | Ryzhikov |
| 8,350,904 | B2 | 1/2013 | Fujimoto et al. |
| 8,988,780 | B2 | 3/2015 | Matthae et al. |
| 9,746,658 | B2 | 8/2017 | Abe |
| 9,939,622 | B2 | 4/2018 | Abe |
| 2019/0324246 | A1 | 10/2019 | Abe |

FOREIGN PATENT DOCUMENTS

| | | | |
|---|---|---|---|
| DE | 42 19 205 | A1 | 12/1993 |
| DE | 2011075982 | A | 4/2011 |
| DE | 10 2011 109 783 | A1 | 2/2013 |
| DE | 10 2017 218 169 | B3 | 3/2019 |
| WO | WO 2004/090603 | A1 | 10/2004 |

OTHER PUBLICATIONS

German Search Report, with translation thereof, for corresponding DE 10 2023 206 339.5, dated Mar. 6, 2024.

*Primary Examiner* — William Choi
(74) *Attorney, Agent, or Firm* — Fish & Richardson P.C.

(57) ABSTRACT

A finity-corrected microscope objective for scanning applications has a numerical aperture of at least and an object field diameter of at least 1 mm. The objective is apochromatically corrected over a spectral bandwidth of at least 200 nm. A distance between an object plane and an intermediate image plane conjugated thereto is not more than 250 mm.

20 Claims, 3 Drawing Sheets

FINITY-CORRECTED MICROSCOPE OBJECTIVE FOR SCANNING APPLICATIONS

CROSS-REFERENCE TO RELATED APPLICATIONS

The present application claims benefit under 35 USC 119 of German patent application DE 10 2023 206 339.5, filed Jul. 4, 2023. The entire disclosure of this application is incorporated by reference herein.

FIELD

The disclosure relates to a finity-corrected microscope objective for scanning applications. The disclosure also relates to an optical assembly and to a microscope with such an objective. The disclosure further relates to the use of a corresponding objective and to a method for automated scanning of a sample.

BACKGROUND

Depending on its field of application, it is desirable for a given microscope objective to satisfy various properties.

Microscope objectives with a high resolution are known. Such objectives are often very large and their use can involve expert knowledge.

US 2019/0324246, U.S. Pat. Nos. 9,746,658 and 8,350,904 relate to dry objectives with high etendues. U.S. Pat. No. 8,988,780, JP 2011075982 and DE 102011109783 relate to immersion objectives with high etendues. These objectives are infinity-corrected. Finity-corrected objectives are known from U.S. Pat. Nos. 9,939,622 and 8,350,904. These are relatively large and/or have a relatively large number of lenses and/or their image quality drops relatively sharply toward the periphery.

SUMMARY

The disclosure seeks to improve a microscope objective. The disclosure seeks to provide a finity-corrected microscope objective with a relatively simplified setup, relatively compact design and relatively improved optical properties.

The objective is finity-corrected. This means that it is designed for a finite optical unit, i.e. for a defined tube length. For example, the objective produces a real intermediate image at a defined, finite distance.

According to a first aspect, the objective may be designed such that a distance ($d_{OI}$) between an object plane (O) and an intermediate image plane (I) conjugated thereto is not more than 250 mm. For example, the distance ($d_{OI}$) may be not more than 205 mm.

According to the disclosure, it has been recognized that it can be desirable, for example for scanning applications in which large, for example large-area, samples are examined, if the microscope objectives used for this purpose have a large field of view and at the same time provide a high resolution over the entire field of view.

The field of view is also referred to as object field.

The Strehl ratio can be used to characterize the resolution. Despite their reduced complexity, the objectives according to the disclosure can have a Strehl ratio of at least 0.8, for example at least 0.85, for example at least 0.89.

For example, the objectives can have such a high Strehl ratio over at least 50%, for example at least 70%, for example at least 90%, for example at least 95% of the field of view, for example over the entire field of view.

For example, they can have such a high Strehl ratio over a partial region of the field of view with an area of at least 1 $mm^2$.

This can help ensure a high resolution in large regions of the field of view, for example over the entire field of view. This cam help make it easier to assemble a plurality of partially overlapping images into a mosaic image.

The reduced complexity leads for example to cost savings and an increase in the robustness of the system.

For example, the objectives may have vignetting of less than 5%, for example less than 3%, for example less than 1%.

They can be apochromatically corrected for example over a spectral bandwidth of at least 200 nm, for example in the range of 400 nm to 800 nm. They can for example be apochromatically corrected over a spectral bandwidth of at least 200 nm, for example in the range of 400 nm to 700 nm. They can, for example be apochromatically corrected in the range of 460 nm to 660 nm.

Apochromatically corrected means that the maximum deviation of the focus position within the spectrum in relation to the reference wavelength lies within the depth of field.

The objectives can have a numerical aperture of at least 0.9, for example at least 0.95.

The objectives according to the disclosure can for example be manufactured cost-effectively. Nevertheless, they can result in a relatively high robustness of the optical system.

For example for scanning applications it may be desirable to take a large number of images and then assemble them into a mosaic image. This can be done automatically.

The objectives may for example have an object field diameter ($d_{obj}=2\ h_{obj}$) of at least 1 mm, for example at least 1.5 mm. The object field diameter is also referred to as the field-of-view size.

For a high throughput, the time used to record the individual images is a factor. It is generally desirable to reduce the time used to record the individual images. This can lead to faster results and an increased throughput. In general, this can lead to lower costs.

A factor that can affect the time used to record the individual images is the field-of-view size of the optical system. A larger field-of-view size can help enable the recording of larger regions in individual images. As a result, fewer frames are used to image an extensive sample. This can result in a reduced scan time and a reduction in the effort used to assemble the images into a mosaic image.

However, it is desirable when enlarging the field-of-view size that the objective has a high resolution for all relevant wavelength ranges across the entire field of view. This desire for a high resolution with a simultaneously large field of view typically corresponds to an increase in, for example a maximization of, the etendue. The etendue is proportional to the square of the linear dimension, for example of the diameter, of the field of view. It is also proportional to the square of the numerical aperture (NA).

At the same time, it may be desirable, for example for routine applications, to reduce the complexity of the microscope objective. For example, this can lead to cost savings. A reduced complexity is understood for example to mean a reduction in the number of used optical elements, for example lenses. For example, the number of aspheric lenses can be reduced. It has been shown that this has resulted in significant cost savings.

According to one aspect, the objective has a maximum of 18 optical elements, for example a maximum of 17 optical elements, for example a maximum of 16 optical elements. Lenses, for example, can serve as optical elements.

The reduced number of optical elements, for example lenses, can lead to a considerable cost saving.

The optical elements may be arranged for example in groups, such as in nine groups. For example, cemented elements are referred to as a group.

Objectives according to the disclosure have a significantly reduced complexity, for example a lower number of lenses at a given etendue. Due to their high Strehl ratio, they nevertheless can help ensure a high resolution over the entire field of view.

According to one aspect, the objective may be designed as a dry objective. This can help simplify the scanning method.

The objective can have a numerical aperture (NA) in the range of 0.9 to 1.0. This can help result in a relatively high resolution.

Optionally, the objective has a chief ray angle on the image side (CRAI, chief ray angle on the image side) of no more than 5°. This can help ensure that the objective can be used with standardized digital image sensors. A small chief ray angle can be desirable for example for the relative illumination and the efficiency of the image sensor.

According to an aspect, a distance (BFL, back focal length) between the rearmost optical surface and the intermediate image plane (I) may be at least 50 mm, for example at least 58 mm. The relatively large distance can simplify the assembly of the optical system.

According to an aspect, the objective can be designed completely without aspheric lenses. This can reduce the complexity of the objective. This can lead for example to a reduction in costs.

The lenses of the objective may be made of at least 8, such as at least 10, for example at least 12, different types of glass.

It has been shown that relatively good optical properties of the objective can be achieved by a suitable selection of different types of glass.

The optical elements, for example the lenses, of the objective can be arranged in three groups G1, G2, G3. Each of these groups can have subgroups.

The first group, G1, may have a positive refractive power.

The second group, G2, may have a positive refractive power.

The third group, G3, may have a negative refractive power.

According to an aspect, the third lens group G3 can have three subgroups (G31, G32 and G33). The first subgroup (G31) may have a positive refractive power. The second subgroup (G32) may have a negative refractive power. The third subgroup (G33) may have a negative refractive power.

Here and below, the sequence of the optical elements of the objective are indicated in the direction from the object field to the image field. In relation to the objective, "front" refers to the side facing the object field, and "rear" refers to the side facing away from the object field.

According to an aspect, the first lens group G1 of the objective can have a cemented element, for example a cemented triplet.

According to an aspect, the second lens group G2 of the objective can have three cemented elements, for example three cemented doublets.

According to an aspect, the third lens group G3 of the objective can have two cemented elements, for example two cemented doublets G31, G33.

Further possible details of the objective are described below.

The objective can have a relatively short working distance. For example, the following may apply:

$$d: L < 4.9 \times 10^{-3},$$

wherein d indicates the distance from the coverslip to the periphery of the frontmost lens surface of the objective, and L indicates the total distance between the object field and the vertex of the (in the direction of the beam) rearmost lens surface of the objective.

The working distance of the objective can also meet the following conditions:

$$d0: L < 9 \times 10^{-3},$$

wherein d0 indicates the distance from the object field to the vertex of the frontmost lens surface.

If the maximum distance of light rays, emanating from an object on the optical axis, to the optical axis is defined in the three subgroups G31, G32 and G33 of the third lens group G3 as h1, h2 and h3, these parameters can for example meet the following inequalities:

$$1.1 < h1: h2 < 1.8 \text{ and/or}$$

$$1.2 < h2: h3 < 1.6.$$

The disclosure seeks to improve a microscope, such as for scanning applications, for example for optical mapping.

The microscope may comprise an automated scanning device. The scanning device can enable a one-dimensional (linear) displacement of the sample, a two-dimensional displacement of the sample, or a three-dimensional displacement of the sample. In addition to linear displacements, the scanning device can also have one, two or three rotational degrees of freedom. This can help make it possible to arrange the samples very flexibly, for example to displace them.

The scanning device may comprise an image acquisition device, such as a digital image acquisition device, for example a digital camera.

The scanning device may comprise an image processing device. The latter may, for example, enable automated processing. For example, this simplifies the stitching of frames into a mosaic image.

The microscope objectives described herein can be desirable for use in scanning applications, for example for optical mapping. For example, they can help simplify automated scanning of large, for example large-area, samples.

The disclosure seeks to improve a method for the automated scanning of a sample.

The disclosure provides a method comprising:

- providing a microscope according to the preceding description;
- providing a sample to be examined;
- acquiring at least two images of different sections of the sample, wherein the sections have an overlap region; and
- assembling the images into a mosaic image.

The method may be, for example, an optical mapping method.

Before the images are assembled, they can be analysed and/or processed using an image processing algorithm. This can help simplify and/or improve the assembly of the images.

It is also possible to analyse and/or process the assembled mosaic image after the images have been assembled using an image processing algorithm. This can help improve the quality.

To record images of different sections of the sample, the latter can be displaced linearly, two-dimensionally or three-dimensionally. It can be displaced for example step-by-step.

For example, the displacement of the sample and the recording of successive images of different sections of the sample can be automated.

Other details of the disclosure are evident from the description of embodiments with reference to the figures.

DETAILED DESCRIPTION

Figure 1:
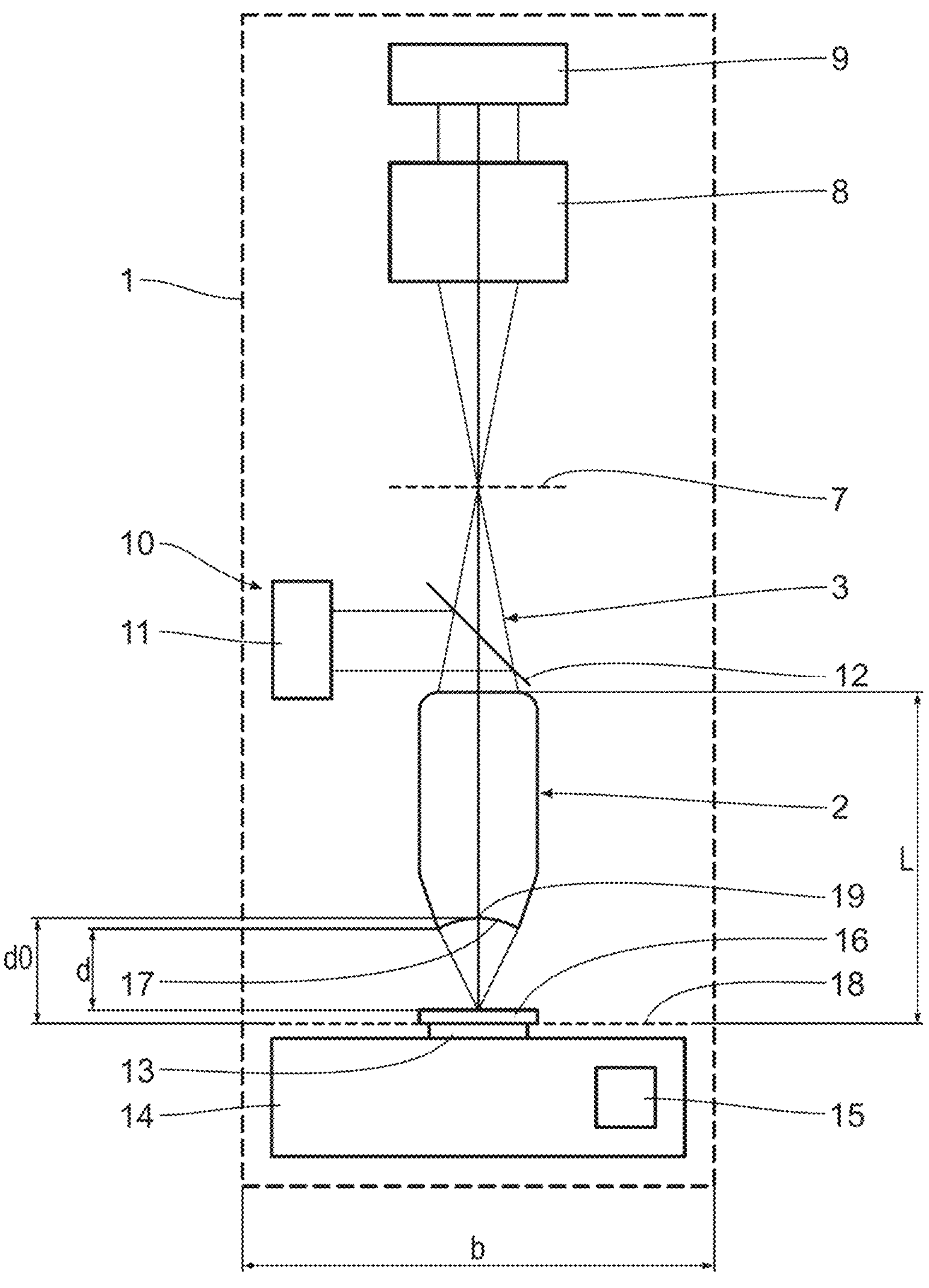
FIG. 1 schematically shows the setup of a microscope.

FIG. 1 schematically shows the basic setup of a microscope 1 by way of example. The illustration should be understood as an example and not as a limitation.

The microscope 1 comprises a finity optical unit. This means that the beam path 3 downstream of the objective 2 passes through a real intermediate image plane 7 at a defined distance. The intermediate image can be viewed using an eyepiece 8. It can also be guided to an image acquisition device, for example in the form of a camera 9. The camera 9 can for example be a digital camera.

FIG. 1 also shows an illumination device 10 as an example. The illumination device 10 has a radiation source unit 11. For example, a laser can serve as the radiation source unit 11.

The illumination device 10 may also have a beam splitter 12. Using the beam splitter 12, the illumination radiation 3 can be guided through the objective 2 to a sample 13 to be viewed. The beam splitter 12 may be arranged in the convergence region between the objective 2 and the intermediate image plane 7.

The beam path shown schematically in FIG. 1 is suitable for example for incident-light (epi-fluorescence) systems. The illumination can be in the form of Köhler illumination. Critical illumination is also possible.

Instead of the beam splitter 12, a prism, for example a cubic prism, may also be provided. Alternative variants for coupling the illumination radiation are known from the prior art.

Also schematically illustrated in FIG. 1 is a scanning device 14. The scanning device 14 comprises one or more displacement devices 15. Using the displacement devices 15, the sample 13 can be displaced relative to the beam path 3, for example relative to the objective 2, in the microscope 1.

To illustrate the working distance of the objective 2, the distance d from the coverslip 16 to the outer periphery of the frontmost lens surface 17 of the objective 2 is shown in FIG. 1 as an example.

The distance from an object plane 18 to the vertex 19 of the frontmost lens surface 17 is shown as d0.

L denotes the total distance between the object plane 18 and the vertex 19 of the (in the beam direction) rearmost lens surface of the objective 2. The latter is not explicitly shown in FIG. 1.

The microscope 1 may have a footprint with a width b of not more than 250 mm, for example not more than 205 mm.

Figure 2:
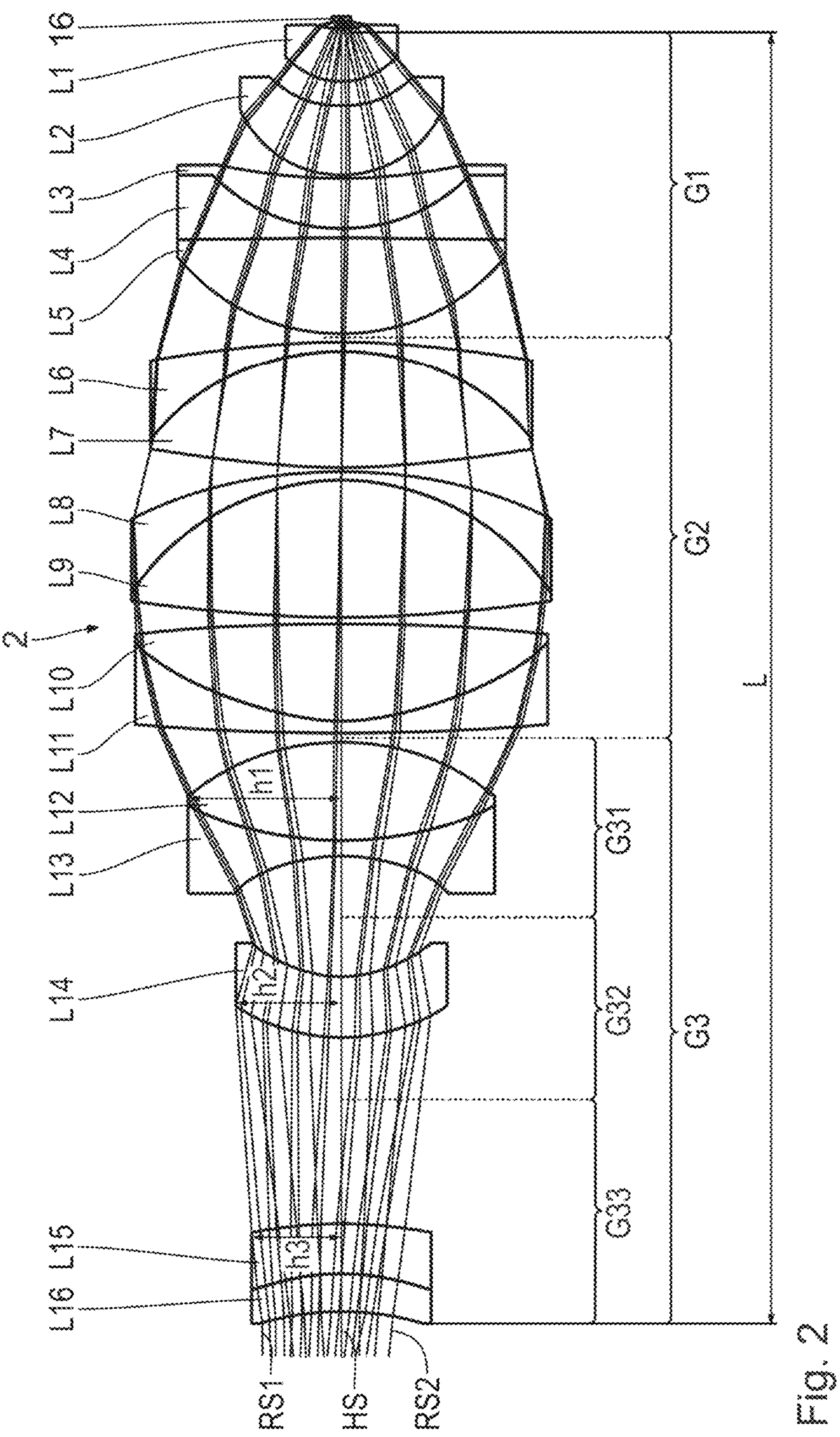
FIG. 2 shows a schematic longitudinal section through the optical components of the microscope objective according to a first variant.

FIG. 2 shows a longitudinal section through the arrangement of the optical components of the objective 2.

The illustrated variant E4 of the objective is suitable for use with coverslips 16 with a thickness of 0.188 mm, a refractive index nd=1.523 and the Abbe number vd=54.52 (based on a d-line of 587.562 nm).

FIG. 2 illustrates by way of example the profile of a central chief ray HS and two marginal rays RS1, RS2.

For reasons of clarity, mechanical components of the objective 2 are not shown in FIG. 2.

The objective 2 is for example an apochromatic objective 2.

The variant (E4) shown in FIG. 2 is for example a dry objective.

The objective 2 according to FIG. 2 has 16 lenses L1 to L16. The lenses L1 to L16 are arranged in 3 groups with a total of 9 subgroups. The subgroups are each formed by single lenses or by cemented elements.

The optical design data of the objective 2 according to FIG. 2 are shown in Tab. 1.

TABLE 1

Optical design data of the objective 2 according to FIG. 2 in the opposite direction, i.e. from the image side to the object side:

| Surface No. | r (mm) | d (mm) | nd | vd |
|---|---|---|---|---|
| Image | | 59.610 | | |
| 1 | −29.979 | 4.063 | 1.638 | 42.41 |
| 2 | −26.122 | 5.351 | 1.488 | 70.41 |
| 3 | −62.246 | 20.317 | | |
| 4 | 20.872 | 6.694 | 2.003 | 28.27 |
| 5 | 14.366 | 12.936 | | |
| 6 | −18.113 | 1.625 | 1.613 | 44.50 |
| 7 | 35.512 | 10.746 | 1.569 | 71.34 |
| 8 | −26.862 | 0.888 | | |
| 9 | 213.454 | 1.474 | 1.558 | 54.01 |
| 10 | 33.083 | 10.658 | 1.728 | 28.53 |
| 11 | −222.471 | 0.557 | | |
| 12 | 142.402 | 14.900 | 1.659 | 71.34 |
| 13 | −27.102 | 1.000 | 1.613 | 44.49 |
| 14 | −53.143 | 0.433 | | |
| 15 | 107.303 | 12.568 | 1.497 | 81.55 |
| 16 | −27.221 | 1.000 | 1.638 | 42.41 |
| 17 | −112.216 | 0.962 | | |
| 18 | 23.244 | 10.344 | 1.659 | 71.34 |
| 19 | −1231.237 | 1.000 | 1.855 | 24.80 |
| 20 | 19.168 | 5.698 | 1.659 | 71.34 |
| 21 | 74.601 | 0.206 | | |
| 22 | 12.168 | 7.337 | 1.755 | 52.32 |
| 23 | 10.368 | 2.766 | | |
| 24 | 8.315 | 5.582 | 1.883 | 40.76 |
| 25 | 11.242 | 1.096 | | |

The refractive index (nd) and the Abbe number (vd) refer to the d-line (587.562 nm). The data relate to the use with a coverslip 16 with a thickness of 0.188 mm.

Additional Data for the Objective 2:

Magnification: 10 times

NA: 0.95

L: 140.39 mm

Distance between object field and intermediate image (dOI): 200 mm d: 0.661 mm d0: 1.096 mm d: L=$4.7\times10^{-3}$ d0: L=$7.8\times10^{-3}$ $h_{obj}$: 0.8 mm Back focus length: 59.61 mm Chief ray angle on the image side (CRAI): 4.65°

The objective 2 has three lens groups G1, G2 and G3. The first lens group G1 has a positive refractive power. It comprises the lenses L1 to L5.

The lenses L3 to L5 form a cemented triplet.

The second lens group G2 has a positive refractive power. The second lens group G2 comprises the lenses L6 to L11.

The lenses L6 and L7 form a cemented doublet.

The lenses L8 and L9 form a cemented doublet.

The lenses L10 and L11 form a cemented doublet.

The third lens group G3 has a negative refractive power. The third lens group G3 comprises the lenses L12 to L16.

The lenses L12 and L13 form a cemented doublet. They form the subgroup G31. The subgroup G31 has a positive refractive power.

The lens L14 forms the subgroup G32. The subgroup G32 has a negative refractive power.

The lenses L15 and L16 form a cemented doublet. They form the subgroup G33. The subgroup G33 has a negative refractive power.

If the maximum distance of light rays, emanating from an object on the optical axis, to the optical axis is defined in the three subgroups G31, G32 and G33 of the third lens group G3 as h1, h2 and h3, then:

h1=16.28 mm, h2=9.78 mm, h3=6.84 mm and so h1:h2=1.665 and h2:h3=1.430.

Figure 3:
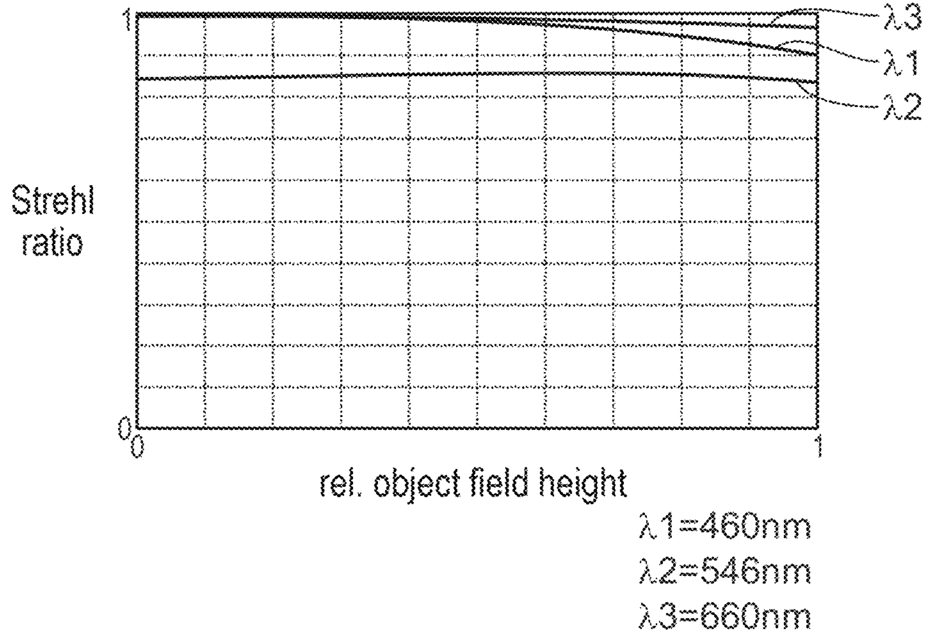
FIG. 3 schematically shows the profile of the Strehl ratio of the objective of FIG. 2 over the field of view under light of different wavelengths.

FIG. 3 shows the Strehl ratios of the objective 2 according to FIG. 2 for light with a wavelength of λ1=460 nm, λ2=546 nm and λ3=660 nm, respectively.

As can be seen from FIG. 3, the Strehl ratio over the entire field of view is greater than 0.8. For individual wavelengths or a limited wavelength range, the Strehl ratio over the entire field of view is even greater, for example greater than 0.83, for example greater than 0.89.

Figure 4:
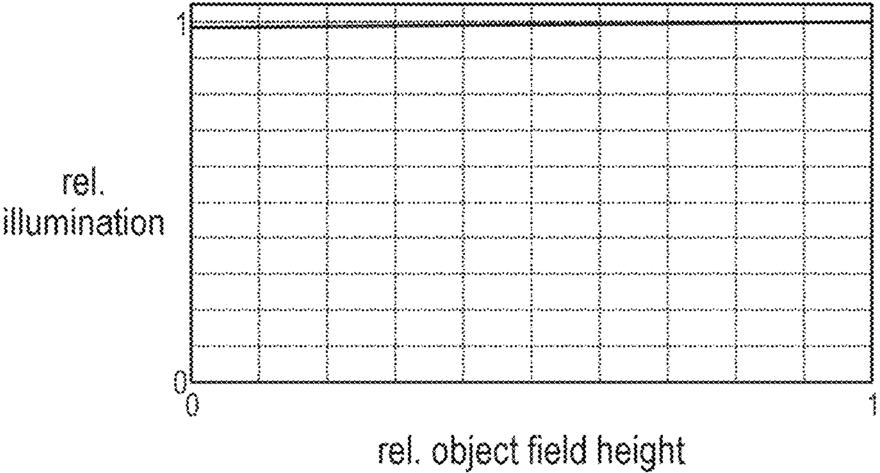
FIG. 4 schematically shows the profile of an intensity of the incident-light illumination over the field of view of the objective of FIG. 2.

In FIG. 4, the relative illumination intensity at a wavelength of 546.074 nm over the field of view is shown for the purpose of illustrating the peripheral light drop.

As can be seen from FIG. 4, the objective 2 leads, under incident-light illumination, to a homogeneous lighting of the field of view with minor vignetting.

What is claimed is:

1. A microscope objective, comprising:

a first lens group with a positive refractive power;

a second lens group with a positive refractive power; and a third lens group with a negative refractive power, wherein the microscope objective:

has a numerical aperture of at least 0.9;

has less than 5% vignetting;

is apochromatically corrected over a spectral bandwidth of at least 200 nanometers (nm);

has an object plane;

has an intermediate image plane conjugated to the object plane;

has an object field diameter of at least 1 millimeter (mm);

has a distance between the object plane and the intermediate image plane that is not more than 250 mm; and is a finity-corrected microscope objective configured to be used in scanning applications.

2. The microscope objective of claim 1, wherein the object field diameter is at least 1.5 mm.

3. The microscope objective of claim 1, wherein the microscope objective has a Strehl ratio of at least 0.8 over at least 70% of a field of view of the microscope objective.

4. The microscope objective of claim 1, wherein the microscope objective comprises a maximum of 18 optical elements.

5. The microscope objective of claim 1, wherein the microscope objective is a dry objective.

6. The microscope objective of claim 1, wherein the microscope objective has a chief ray angle on an image side that is not more than 5°.

7. The microscope objective of claim 1, wherein a distance between a rearmost optical surface of the microscope objective and the intermediate image plane is at least 50 mm.

8. The microscope objective of claim 1, wherein the microscope objective is apochromatically corrected over a bandwidth of at least 200 nm in a wavelength range between 400 nm and 800 nm.

9. The microscope objective of claim 1, wherein:

the third lens group comprises first, second and third subgroups;

the first subgroup has a positive refractive power;

the second subgroup has a negative refractive power; and the third subgroup has a negative refractive power.

10. The microscope objective of claim 1, wherein the microscope objective does not have aspheric lenses.

11. The microscope objective of claim 1, wherein the microscope objective has the following optical design data (in reverse order):

| Surface No. | r (mm) | d (mm) | nd | vd |
|---|---|---|---|---|
| Image | | 59.610 | | |
| 1 | −29.979 | 4.063 | 1.638 | 42.41 |
| 2 | −26.122 | 5.351 | 1.488 | 70.41 |
| 3 | −62.246 | 20.317 | | |
| 4 | 20.872 | 6.694 | 2.003 | 28.27 |
| 5 | 14.366 | 12.936 | | |
| 6 | −18.113 | 1.625 | 1.613 | 44.50 |
| 7 | 35.512 | 10.746 | 1.569 | 71.34 |
| 8 | −26.862 | 0.888 | | |
| 9 | 213.454 | 1.474 | 1.558 | 54.01 |
| 10 | 33.083 | 10.658 | 1.728 | 28.53 |
| 11 | −222.471 | 0.557 | | |
| 12 | 142.402 | 14.900 | 1.659 | 71.34 |
| 13 | −27.102 | 1.000 | 1.613 | 44.49 |
| 14 | −53.143 | 0.433 | | |
| 15 | 107.303 | 12.568 | 1.497 | 81.55 |
| 16 | −27.221 | 1.000 | 1.638 | 42.41 |
| 17 | −112.216 | 0.962 | | |
| 18 | 23.244 | 10.344 | 1.659 | 71.34 |
| 19 | −1231.237 | 1.000 | 1.855 | 24.80 |
| 20 | 19.168 | 5.698 | 1.659 | 71.34 |
| 21 | 74.601 | 0.206 | | |
| 22 | 12.168 | 7.337 | 1.755 | 52.32 |
| 23 | 10.368 | 2.766 | | |
| 24 | 8.315 | 5.582 | 1.883 | 40.76 |
| 25 | 11.242 | 1.096. | | |

12. The microscope objective of claim 1, wherein the object field diameter is at least 1.5 mm, and the microscope objective has a Strehl ratio of at least 0.8 over at least 70% of a field of view of the microscope objective.

13. The microscope objective of claim 1, wherein the object field diameter is at least 1.5 mm, and the microscope objective comprises a maximum of 18 optical elements.

14. The microscope objective of claim 1, wherein the object field diameter is at least 1.5 mm, and the microscope objective is a dry objective.

15. The microscope objective of claim 1, wherein the object field diameter is at least 1.5 mm, and the microscope objective has a chief ray angle on an image side that is not more than 5°.

16. The microscope objective of claim 1, wherein the object field diameter is at least 1.5 mm, and a distance between a rearmost optical surface of the microscope objective and the intermediate image plane is at least 50 mm.

17. A microscope, comprising:

a microscope objective according to claim 1.

18. The microscope of claim 17, wherein the microscope has a footprint of at most 250 mm×200 mm.

19. The microscope of claim 17, wherein the microscope is an automated scanning device.

20. A method, comprising:

using a microscope to acquire at least two images of different sections of a sample, the sections comprising an overlap region; and assembling the images into a mosaic image, wherein the microscope comprises a microscope objective according to claim 1.

* * * * *